(12) United States Patent
Renner et al.

(10) Patent No.: US 7,511,769 B2
(45) Date of Patent: Mar. 31, 2009

(54) INTERFRAME NOISE REDUCTION FOR VIDEO

(75) Inventors: Karl Hertzian Renner, Dallas, TX (US); Shereef Shehata, Allen, TX (US); Jason Meiners, Richardson, TX (US); Weider Peter Chang, Hurst, TX (US)

(73) Assignee: Texas Instruments Incorporated, Dallas, TX (US)

( * ) Notice: Subject to any disclaimer, the term of this patent is extended or adjusted under 35 U.S.C. 154(b) by 543 days.

(21) Appl. No.: 11/109,290

(22) Filed: Apr. 19, 2005

(65) Prior Publication Data

US 2006/0232709 A1  Oct. 19, 2006

(51) Int. Cl.
*H04N 5/21* (2006.01)
*H04N 1/409* (2006.01)
*H04N 1/58* (2006.01)

(52) U.S. Cl. .................. 348/627; 348/666; 348/607; 348/609; 382/275

(58) Field of Classification Search .......... 348/666, 348/663, 664, 665, 667, 606, 607, 608, 609, 348/627, 701; 375/240.02, 240.27; 382/275, 382/261, 260

See application file for complete search history.

(56) References Cited

U.S. PATENT DOCUMENTS

| 5,526,446 | A | * | 6/1996 | Adelson et al. ............. 382/275 |
| 5,568,196 | A | | 10/1996 | Hamada et al. |
| 5,754,699 | A | * | 5/1998 | Sugahara .................... 382/233 |
| 5,799,111 | A | * | 8/1998 | Guissin ...................... 382/254 |
| 6,061,100 | A | | 5/2000 | Ward et al. |
| 6,285,710 | B1 | * | 9/2001 | Hurst et al. ............ 375/240.12 |
| 6,343,097 | B2 | | 1/2002 | Kobayashi et al. |
| 2006/0050783 | A1 | * | 3/2006 | Le Dinh et al. .......... 375/240.2 |

OTHER PUBLICATIONS

Charles Poynton, "A Technical Introduction to Digital video", Chapter 1, 1996, pp. 1-31.
Stephen G. Lajeunesse, Application Note AN9644 entitled "Composite Video Separation Techniques", Intersil Americas Inc., Oct. 1996, pp. 1-8.

* cited by examiner

*Primary Examiner*—David L Ometz
*Assistant Examiner*—Jean W Désir
(74) *Attorney, Agent, or Firm*—Mirna Abyad; Wade J. Brady, III; Frederick J. Telecky, Jr.

(57) ABSTRACT

A system to reduce noise includes a noise measurement device that provides a measure of noise associated with a digital input video signal. A noise reduction filter provides a noise-reduced digital output video signal corresponding to the luma and chroma of the digital input video signal. The noise reduction filter has a parameter that varies on a pixel basis for the component of the digital input video signal as a function of the measure of noise. The range and sensitivity of the noise reduction can be user programmable.

20 Claims, 6 Drawing Sheets

INTERFRAME NOISE REDUCTION FOR VIDEO

TECHNICAL FIELD

The present invention relates generally to signal processing and, more particularly, to interframe noise reduction for video signals.

BACKGROUND

The presence of noise in a video signal can have a significant impact on picture quality. As the size of many video displays increase, the impact of noise in video signals tends to increase proportionally. Noise can be introduced into video signals from one or more different sources. Artifacts, for example, can originate from the imaging and recording equipment, from environmental circuitry, from transmission equipment, from communication channels, and from encoding and decoding equipment. The particular affects of noise can be different on different components of the video signal, including the luma and chroma components.

Various digital image processing techniques have been developed in an effort to reduce video noise. In one existing technique for removing noise from a video signal, an interframe low pass filter is constructed by making use of the fact that there is a high interframe correlation between image signals, but not much interframe correlation between noise. This technique efficiently removes noise from signal components in stationary images or slowly moving parts of images. In a post-processing scheme, a filter is introduced to remove coding noise in motion compensated interframe coding where the signals are assumed to be compressed.

Another example of video signal filtering is the decoding of composite television signals to separate luminance and chrominance information. A wide range of decoder circuits have been proposed to suit the differing demands posed by the numerous applications for decoders. These demands differ not only in the cost to performance relationship, but also in the behavior of the filter.

While filtering reduces noise in a video image, some current approaches can also reduce the resolution (e.g. sharpness) of the image, leading to imprecise edge transitions, thereby reducing apparent focus. These abrupt changes are typically oriented in a vertical or horizontal direction, such as an edge between a blue sky and a black building. Accordingly, an improved approach for reducing noise reduction for video signals is desired.

SUMMARY

The present invention relates generally to reducing noise in an input video signal. Noise measurement is made on a digitized video signal, such as may be composite video or a luma input, for example. The noise measurement can be made at any time when active video is not present. The measured noise is processed (e.g., by a processor or other circuitry) to generate controls for noise reduction circuitry. The controls generated for the noise reduction circuitry further may be programmable, such that resulting filter characteristics can be tuned for a given application. The noise reduction circuitry comprises a recursive filter that operates on the luma component and the demodulated chroma components to provide noise-reduced output video signals for the respective video components. The recursive filter employs a filter parameter that adaptively adjusts filter characteristics based on the noise measurement One aspect of the present invention provides a system to reduce noise that includes a noise measurement device that provides a measure of noise associated with a digital input video signal. A noise reduction filter provides a noise-reduced digital output video signal corresponding to a component of the digital input video signal. The noise reduction filter has a parameter that varies on a pixel basis for the component of the digital input video signal as a function of the measure of noise. For example, the parameter of noise reduction filter can be computed (e.g., on a per pixel basis) as a function of coring thresholds. The coring thresholds can be determined as a function of the measure of noise and a noise sensitivity factor to establish a range of potential values for the parameter of the noise reduction filter.

The noise reduction filter may further employ a selector to select the filter parameter for a given pixel according to the measure of noise (e.g., depending on whether a low level of noise is present in the digital output video signal). For example, the selector can select from among the noise reduction filter parameter that is calculated for a given as a function of the coring values and a motion parameter indicative of motion for the given pixel based on the measure of noise. The noise reduction filter thus can employ the filter parameter that is selected by the selector to implement noise reduction characteristics on the given pixel.

DETAILED DESCRIPTION

The present invention relates generally to reducing noise in an input video signal. Noise measurement is made on a digitized video signal, such as may be composite video or a luma input, for example. The noise measurement can be made at any time when active video is not present. The measured noise is processed (e.g., by a processor or other circuitry) to generate controls for noise reduction circuitry. The controls generated for the noise reduction circuitry further may be programmable, such that resulting filter characteristics can be tuned for a given application. The noise reduction circuitry comprises a recursive filter that operates on the luma component and the demodulated chroma components to provide noise-reduced output video signals for the respective video components. The recursive filter employs a filter parameter that adaptively adjusts filter characteristics based on the noise measurement.

Figure 1:
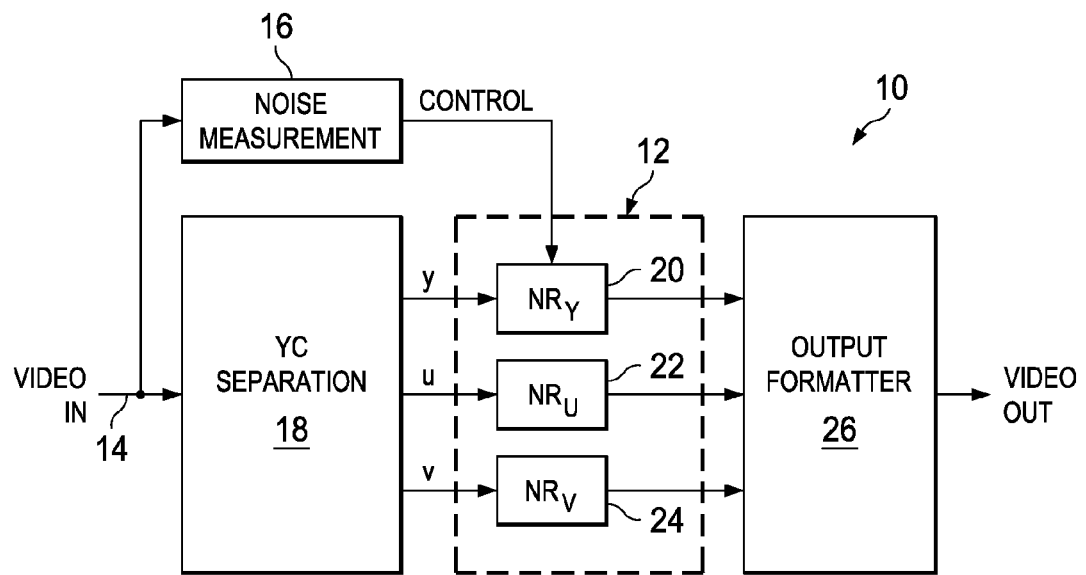
FIG. 1 illustrates an example of a noise reduction system according to an aspect of the present invention.

FIG. 1 depicts an example of a system 10 that can be utilized to reduce noise in a digital video signal. The system 10 implements adaptive control of a noise reduction filter system 12 based on a measure of noise in the input video signal (VIDEO IN) provided at an input 14. A noise measurement system 16 quantifies a level noise associated with the VIDEO IN signal and provides a corresponding measure of such noise. For example, the noise measurement system 16 is operative to detect noise in an area of the VIDEO IN signal where there is no active video. For the example of NTSC video, the noise measurement can be made during the vertical blanking interval during the horizontal sync tip, or during sample intervals in which active video is not present. The noise measurements can be made over one or more frames based on which an average measure of noise can be provided to the filter system 12.

In the example of FIG. 1, the system 10 includes a YC separation block 18 that is operative to separate the digital VIDEO IN signal into separate components thereof; namely, into a luma component (Y) and two chroma components (U and V). The filter system 12 can operate independently to reduce noise associated with each of the Y U and V signal components provided by the YC separation block 18. Thus, the filter system 12 includes a noise reduction filter for each of the respective components. Thus, in the example of FIG. 1, the filter system 12 includes a noise reduction filter ($NR_Y$) 20 for the luma component, a noise reduction filter 22 ($NR_U$) for the U chroma component, and a noise reduction filter 24 ($NR_V$) for the V chroma component. Each of the filters 20, 22 and 24 is operative to adaptively remove noise from the respective signal components and provide a corresponding noise-reduced component output signal, such as to an output formatter 26. The output formatter 26 is operative to provide an output video signal (VIDEO OUT) in any desired digital format.

By way of example, each filter 20, 22, 24 can be implemented in hardware or in a combination of hardware and software as a recursive filter. Each filter 20, 22, 24 is configured to determine a filter parameter (referred to herein as "k") that adaptively controls noise reduction characteristics relative to each of the component video signals. For instance, a filter parameter value can be computed for a given pixel based on the measure of noise, such as a function of one or more coring values. As used herein, the term "pixel" refers to a picture element of a digital image, which may correspond to the smallest logical unit of the image or to a group of one or more of the smallest logical units of the image. The physical size of a pixel generally depends on the resolution of the display screen.

The noise measurement system 16 can determine the coring values for the given filter adaptively as a function of the measure of noise and a corresponding noise sensitivity parameter. The noise sensitivity parameter can be defined for each of the filters 20, 22 and 24. The coring values can be determined and updated at a predefined interval (e.g., once per frame). The noise measurement system 16 thus can provide the coring values and an indication of the measure of noise as control information to each of the respective filters 20, 22 and 24. The control information may be the same of different for the respective filters 20, 22 and 24. The control information operates to control filter parameters and the corresponding noise reduction characteristics implemented for each pixel in the Y, U, and V video signals input to the respective filters 20, 22 and 24.

Figure 2:
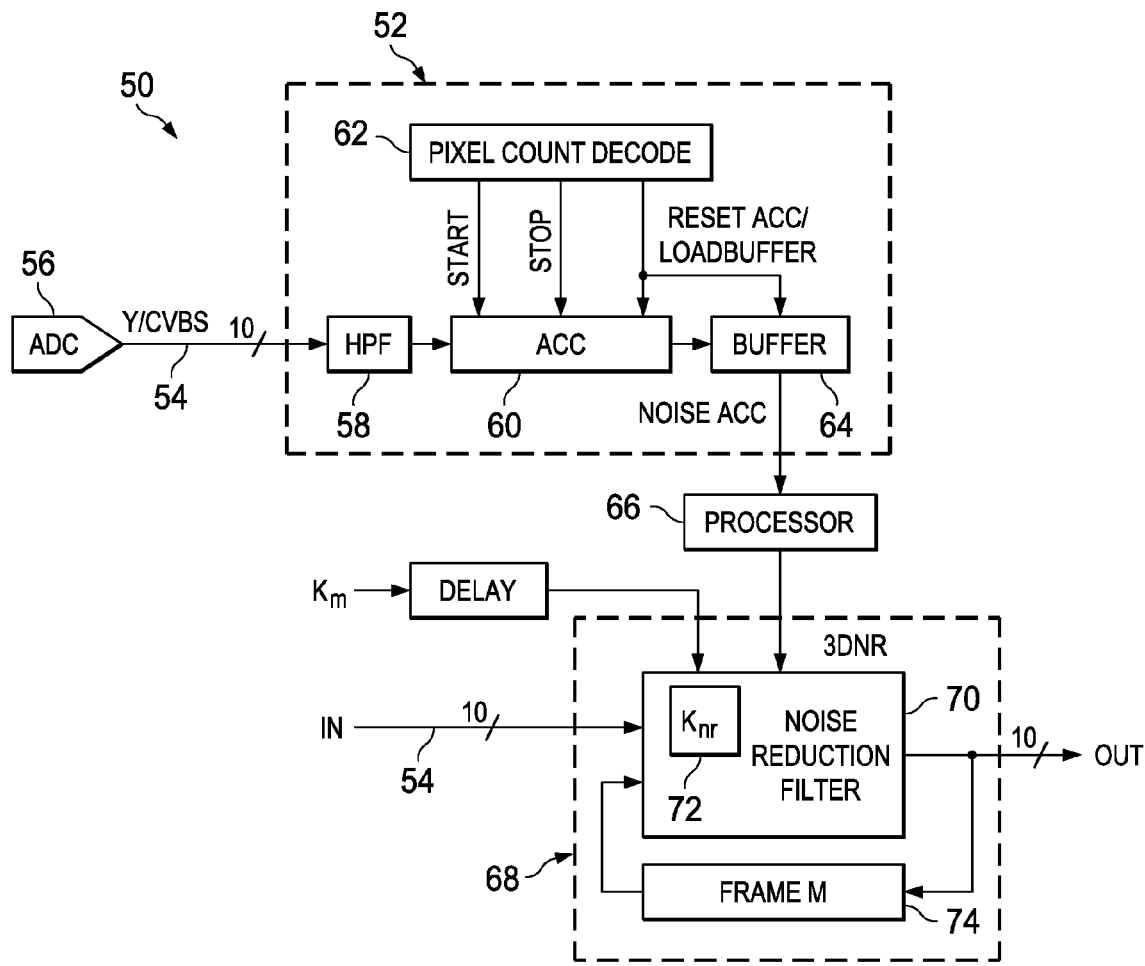
FIG. 2 illustrates an example of another noise reduction system according to an aspect of the present invention.

FIG. 2 depicts an example of part of a filter system 50 that can be utilized according to an aspect of the present invention. The system 50 includes a noise measurement system 52 that is operative to perform noise measurement on a digital input video signal. The input video signal 54 can be provided from an analog-to-digital converter 56. The input video signal thus may be a corresponding digital signal such as a composite video (CVBS) signal. Alternatively, the signal 54 can be the luma component Y of S video or component video. The input digital signal 54 is provided to a high pass filter (HPF) 58 of the noise measurement system. The high pass filter 58 can be tuned to remove low frequency components of the input signal such that high frequency noise is passed at a corresponding output thereof. An accumulator (ACC) 60 is operative to accumulate samples of the resulting noise provided by the high pass filter 58. The accumulator 60 can sample the output of the filter 58 in response to signals provided by a pixel count decode block 62. The pixel count decode block 62 controls start and stop times of the accumulator 60 to update a quantitative representation of the actual noise at a predetermined interval, such as once per video frame, although other intervals can be used. Thus, the pixel count decode block 62 counts pixels and track the number of pixels per frame or lines per frame in order to control the accumulator 60 to store sample signals at a desired rate.

As an example, the pixel count decode block 62 can be configured to control the accumulator 60 to sample the digital indication of noise provided by the high pass filter 58 at predetermined intervals such as corresponding to when no active video is present, such as during vertical blanking or the horizontal sync. The accumulator 60 provides a corresponding sample noise value signal to a corresponding output buffer 64. The output buffer 64 stores the updated sample noise value, which may be a time-averaged measure of the noise over one or more frames. The buffer 64 further can be reset in response to the pixel count decode block 62. The buffer 64 provides the indication of the measure of accumulated noise in the associated input video signal 54 to an associated processor 66.

The processor 66 can be programmed (e.g., via firmware) to determine one or more filter parameters employed by an associated noise reduction filter system 68. The processor 66 determines at least some of the parameters as function of the measure of noise provided by the buffer 64. For example, the processor 66 can determine coring values (e.g., thresholds) as a function of the measure of noise and a coring limit, which operates to limit the coring values. Additionally, the coring values are determined as the function of a noise sensitivity factor. The noise sensitivity factor and the coring limit may be user-programmable and calibrated according to a given application. The coring limits control the range of noise reduction; when excessive noise is present the extent of noise reduction can be limited via the coring limits to avoid undesirable artifacts in the picture. Since the noise sensitivity factor and coring limit may be programmable, an optimal amount of noise reduction can be achieved by the filter system 68 for each application, and further may be tuned as circumstances might change. The processor 66 provides corresponding coring values to a noise reduction filter 70 of the filter system 68. The processor 66 can also provide an indication of the measure of noise to the filter system 68.

The noise reduction filter 70 can be implemented as a recursive filter that provides a noise-reduced output (OUT). The noise reduction filter 70 includes circuitry 72 that is configured to compute a filter parameter $k_{nr}$ as a function of the coring values provided by the processor 66. Specifically, the filter parameter $k_{nr}$ can be computed depending on a difference between the noise-reduced output signal OUT and the input signal 54 and as a function of the coring value as provided by the processor 66. The noise reduction filter 70 selects the filter parameter k as either the computed $k_{nr}$ value or a motion parameter $k_m$. The $k_m$ parameter corresponds to a delayed indication of motion associated with each pixel in the input signal 54, which can be normalized to the same level as $k_{nr}$ (e.g., normalized between zero and one). Those skilled in the art will understand and appreciate various approaches that can be employed to generate an indication of motion as the motion parameter $k_m$. The noise reduction filter 70 can select the filter parameter k based on the measure of noise, which is provided to the noise reduction filter 70 via the processor 66. As an example, if the noise reduction filter 70 determines that there is a low measure of noise, the filter parameter can be set to the maximum of $k_{nr}$ and $k_m$, else the filter parameter can be set to $k_{nr}$ (as computed by the $k_{nr}$ circuitry 72). An output frame buffer 74 buffers the noise-reduced output signal and feeds the noise-reduced buffer signal as a corresponding input to the noise reduction filter 70.

Figure 3:
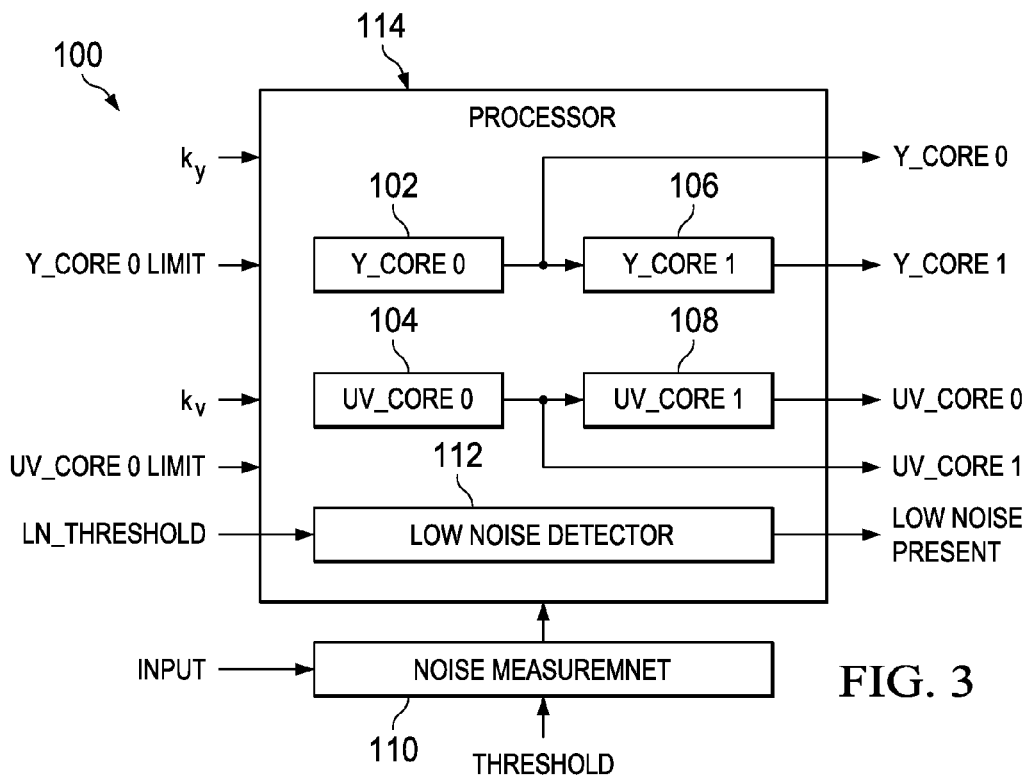
FIG. 3 illustrates an example of a noise analysis engine that can be utilized in a noise reduction system according to an aspect of the present invention.

FIG. 3 depicts an example of part of a noise analysis engine 100 that can be implemented according to an aspect of the present invention. The noise analysis engine 100 includes coring functions 102, 104, 106 and 108 that are programmed and/or configured to compute respective coring values. According to an aspect of the present invention, the coring values set adaptive coring thresholds that are employed to control filter characteristics as described herein. For example, the coring thresholds can be updated once per frame. Other update intervals could be used.

In the example of FIG. 3, the coring function 102 is programmed to compute a first luma coring threshold indicated at Y_CORE 0. For instance, the first luma coring threshold Y_CORE 0 can be computed as a function of the noise measurement and a noise sensitivity factor ($\lambda_y$) for the luma component of the digital video input signal. The measure of noise can be provided by a noise measurement component 110. The noise measurement component 110 can sample and accumulate an average measure of noise based on samples obtained at predetermined times, such as described herein. The noise sensitivity factor $\lambda_y$ can be a user-programmable digital value (e.g., stored in a register, where $0<\lambda_y<10$) that defines the responsiveness of the filter relative to the noise in the luma component of the digital input video signal. A coring limit (CORE 0 LIMIT) can also be programmed to define a maximum coring value for the first coring threshold Y_CORE 0. The coring limit can operate to disable the noise reduction filter when the noise becomes excessive. The second luma coring function 106 computes a second luma coring threshold Y_CORE 1 based on the first coring threshold Y_CORE 0. As an example, the second luma coring threshold Y_CORE 1 can be computed as the smallest power of two that is larger than Y_CORE 0.

Chroma coring functions 104 and 108 also compute coring thresholds for the chroma components of the digital video input signal. For example, the first chroma coring function 104 can compute a first chroma coring threshold UV_CORE 0 as a function of an average measure of noise and a chroma noise sensitivity factor ($\lambda_{uv}$). The chroma noise sensitivity factor $\lambda_{uv}$ can be a user-programmable digital value (e.g., stored in a register) that sets the responsiveness of the filter relative to the noise in the chroma components of the digital input video signal. The coring limit (CORE 0 LIMIT) can also be applied to define a maximum limit for the first chroma coring threshold UV_CORE 0. The second chroma coring function 106 computes a second chroma coring threshold UV_CORE 1 based on the first chroma coring threshold UV_CORE 0 (e.g., computed as the smallest power of two larger that is larger than UV_CORE 0).

The noise analysis engine 100 can also include a low noise detector 112. The low noise detector 112 can be programmed to determine whether the measure of noise from the noise measurement component 110 indicates a low noise condition. A low noise condition can exist by the low noise detector comparing the average measure of noise relative to a low noise threshold value (LN_THRESHOLD). The LN_THRESHOLD value can be programmable according to the application in which the noise reduction system is being implemented. The low noise detector 112 thus provides an indication of whether low noise is present in the input video signal, such as may correspond to a binary output, indicated at LOW NOISE PRESENT.

The coring functions 102, 104, 106 and 108 as well as the low noise detector 112 can be implemented as computer-executable instructions running in a processor 114, for example. The instructions can be programmed via firmware (e.g., read only memory) in conjunction with values for the noise sensitivity factors, coring limits and low noise threshold, which can be programmed into a corresponding register or other memory.

While the noise analysis engine 100 illustrates common coring functions 104 and 108 with respect to the chroma components, it is to be understood that separate coring functions can be employed with regard to each of the U and V chroma components. Additionally, if separate chroma coring functions are used, the same or different noise sensitivity factors could be utilized for computing each of the coring thresholds for the U and V chroma components.

Figure 4:
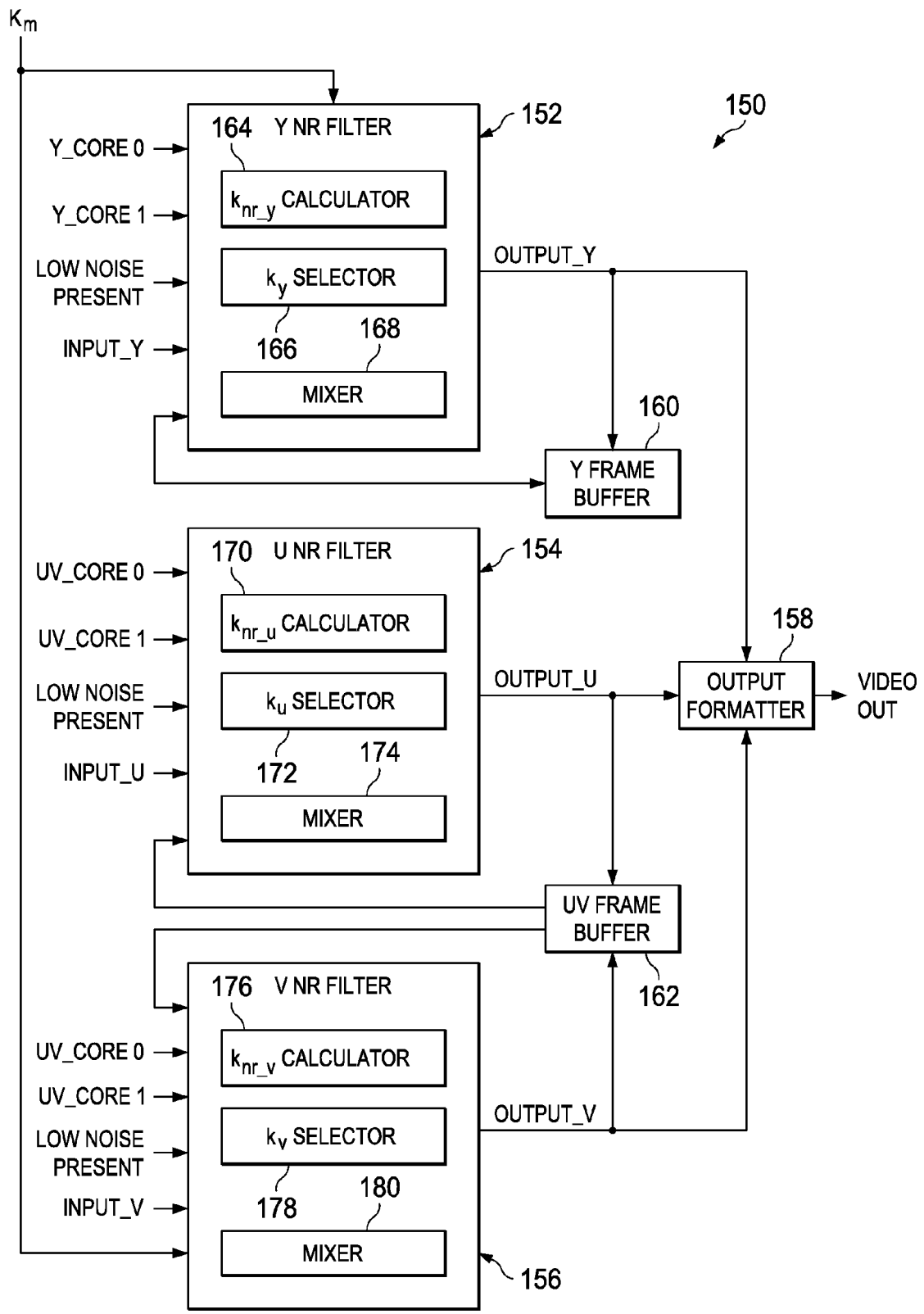
FIG. 4 illustrates an example of a filter system having filters for a plurality of video components that can be implemented according to an aspect of the present invention.

FIG. 4 depicts an example of a filter system 150 that can be implemented according to an aspect of the present invention. The filter system 150 includes a luma noise reduction filter (Y NR FILTER) 152 for reducing noise in a luma video component, indicated at INPUT_Y. The filter system 150 also includes a pair of chroma noise reduction filters (U NR FILTER) 154 and (V NR FILTER) 156 for reducing noise in each of the chroma video components, indicated respectively at INPUT_U and INPUT_V. Each of the component filters 152, 154 and 156 provides a corresponding noise-reduced output signal, indicated at OUTPUT_Y, OUTPUT_U and OUTPUT_V, such as to an output formatter 158. The output formatter 158 combines the component noise-reduced output signals OUTPUT_Y, OUTPUT_U and OUTPUT_V and provides a corresponding output signal (VIDEO OUT) in a desired digital video format (e.g., YCrCb, RGB or like).

Each of the filters 152, 154 and 156 is implemented as a recursive filter, for example, as an infinite impulse response (IIR) filter that has filter characteristics that vary as a function of a filter parameter, k. The respective filters 152, 154 and 156 can be implemented in hardware, such as including combinational logic (e.g., including an arithmetic logic unit, adders, multipliers and the like). The filter parameter k further can vary for each filter 152, 154, 156 as a function of coring thresholds, such as provided by the noise analysis engine (see, e.g., FIG. 3). Thus, the noise-reduced output signals OUTPUT_Y, OUTPUT_U and OUTPUT_V are stored in corresponding frame buffers 160 and 162 that feeds back a delayed indication of the noise-reduced signal for the respective signal components. As a result, the noise reduction for each signal component depends on temporal interframe characteristics of the noise.

The Y NR FILTER 152 is configured to reduce noise in the luma component input signal INPUT_Y. The Y NR FILTER 152 includes a calculator ($k_{nr\_y}$ CALCULATOR) 164 that computes a value of a filter parameter $k_{nr\_y}$, which varies on a pixel basis for the luma component of the digital input video signal. The $k_{nr\_y}$ CALCULATOR 164 computes the $k_{nr\_y}$ parameter for each pixel as a function of the measure of noise. For example, the $k_{nr\_y}$ parameter can be computed as a function of luma coring values Y_CORE 0 and Y_CORE 1. The $k_{nr\_y}$ parameter example further can be set to a predetermined level depending on whether the interframe noise level has a predetermined relationship relative to the coring values.

By way of further example, the $k_{nr\_y}$ parameter be calculated as a function of the coring values based on the following equation:

$$k_{nr} = \begin{cases} 0 & \text{if } \Delta < Y\_CORE0 \\ 1 & \text{if } \Delta > (CORE0 + CORE1) \\ \left(\frac{\Delta - CORE0}{CORE1}\right) & \text{if } CORE0 \leq \Delta \leq CORE1 \end{cases} \quad \text{Eq. 1}$$

where: Δ=the difference between the component input signal and the delayed, noise-reduced output signal.

The $k_{nr\_y}$ CALCULATOR 164 can thus employ Eq. 1 to compute a $k_{nr\_y}$ value based on $\Delta_y$ (where $\Delta_y$=INPUT_Y(n)−OUTPUT_Y(n−1), where n denotes the frame sample of the signal) and based on the respective luma coring values Y_CORE 0 and Y_CORE 1.

The Y NR FILTER 152 also includes a selector ($k_y$ SELECTOR) 166 that selects a value for $k_y$ based on the measure of noise. As an example, the $k_y$ SELECTOR 166 can select a value of $k_y$ from $k_{nr\_y}$, which is computed by the $k_{nr\_y}$ CALCULATOR 164, and an input value $k_m$. The input value $k_m$, for example, corresponds to an indication of motion for a given pixel, such as can be determined on a per pixel basis by a motion detector. According to one embodiment, the value of $k_m$ is determined via a motion detection implemented in the 3 dimensional luma/chroma separation block (3DYC). By way of further example, if the LOW NOISE PRESENT input indicates the presence of a low amount of noise, the $k_y$ SELECTOR 166 can select $k_y$ as the maximum of the $k_{nr\_y}$ and the $k_m$ values ($k_y$=max ($k_{nr\_y}$, $k_m$)). If low noise is not present, the $k_y$ SELECTOR 166 can set $k_y$=$k_{nr\_y}$. The $k_y$ SELECTOR 166 may also be programmed to limit the value of $k_y$ in case the input video signal is too noisy (e.g., if noise>high noise threshold).

A mixer 168 combines the selected value of $k_y$ with $\Delta_y$ to provide an adjusted value of $\Delta_y$, such as corresponding to ky*$\Delta_y$. The adjusted value is summed with the delayed, noise-reduced output signal OUTPUT_Y(n−1). The mixer 168 thus provides a corresponding noise-reduced output signal OUTPUT_Y(n). The mixing and computations implemented by the filter 152 are performed on a per pixel basis. The coring values Y_CORE 0 and Y_CORE 1 and the low noise present values can be updated at a predefined interval, such as once per frame.

The U NR FILTER 154 and the V NR FILTER 156 can be similarly configured. Briefly stated, the U NR FILTER 154 includes a $k_{nr\_u}$ CALCULATOR 170 that computes a value for a filter parameter $k_{nr\_u}$. For example, $k_{nr\_u}$ is computed for each pixel according to Eq. 1, based on chroma coring threshold values UV_CORE0 and UV_CORE1 and based on the difference between the INPUT_U and the delayed, noise-reduced version of the OUTPUT_U(n−1) provided by the frame buffer 162. While a single frame buffer 162 is shown in FIG. 4 associated with each of the filters 154 and 156, it is to be understood and appreciated that the physical memory configuration (e.g., static dynamic random access memory) for each of the respective frame buffers 160 and 162 may be implemented in variety of ways.

A $k_u$ selector 172 further selects the value of $k_u$ from the value of $k_{nr\_u}$ and the input value $k_m$ based on the LOW NOISE PRESENT input. The value of $k_m$ for a given pixel can be the same for each of the Y, U and V components, although different $k_m$ values can be utilized for different components of the video signal. A mixer 174 combines the selected $k_u$ with the difference between the component input signal and the delayed, noise-reduced output signal $\Delta_u$ to provide an adjusted delayed value (e.g., corresponding to ky*$\Delta_u$). The adjusted value is summed with the delayed, noise-reduced output signal OUTPUT_U(n−1) to provide the corresponding noise-reduced output signal OUTPUT_U(n).

The V NR FILTER 156 includes a $k_{nr\_v}$ CALCULATOR 176 that computes a value for a filter parameter $k_{nr\_v}$. For example, $k_{nr\_v}$ is computed for each pixel according to Eq. 1, based on chroma coring threshold values UV_CORE0 and UV_CORE1 and based on the difference between the INPUT_V and the delayed, noise-reduced version of the OUTPUT_V(n−1) from the frame buffer 162. A $k_v$ selector 178 further selects the value of $k_v$ from the value of $k_{nr\_v}$ and the input value $k_m$ based on the LOW NOISE PRESENT input. A mixer 180 combines the selected $k_v$ with the difference between the component input signal and the delayed, noise-reduced output signal $\Delta_v$ to provide an adjusted delayed value (e.g., corresponding to ky*$\Delta_v$). The adjusted value is summed with the delayed, noise-reduced output signal OUTPUT_V(n−1) to provide the corresponding noise-reduced output signal OUTPUT_V(n).

Figure 5:
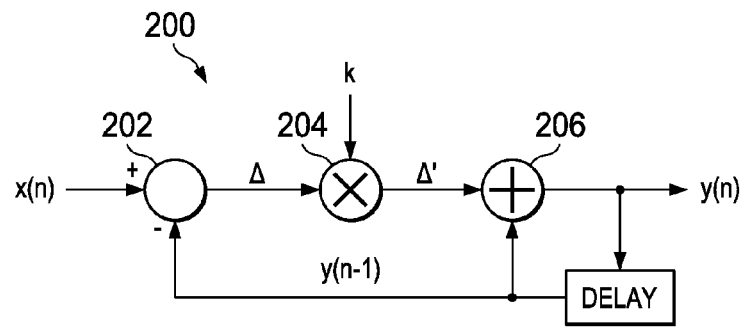
FIG. 5 illustrates an example of a recursive filter that can be employed to reduce noise in a video signal according to an aspect of the present invention.

FIG. 5 depicts an example of a noise reduction filter 200 that can be implemented in a noise reduction system according to an aspect of the present invention. As mentioned above, the filter 200 can be implemented for the luma component filter and for each of the chroma component filters. The filter 200 can be implemented as combinational logic that is configured to reduce noise associated with each input pixel x(n) (or at least a portion of pixels) in a given video frame and to provide a corresponding noise-reduced output signal y(n). For purposes of simplicity of explanation, the example of FIG. 5 depicts the filter 200 implemented for a given pixel.

The filter 200 is a recursive filter, such as can be implemented as an IIR filter, that averages a portion of the input x(n) with a delayed, noise-reduced output y(n−1). The filter 200 includes a summation component 202 that subtracts the delayed, noise-reduced output y(n−1) from the input pixel x(n) providing an output Δ, where (Δ=x(n)−y(n−1)). A multiplier 204 multiplies a noise factor parameter k times Δ to provide an adjusted value of Δ'(Δ'=k*Δ). A summer 206 sums Δ' with delayed, noise-reduced output y(n−1) to provide the noise-reduced output y(n)=Δ'+y(n−1).

Figure 6:
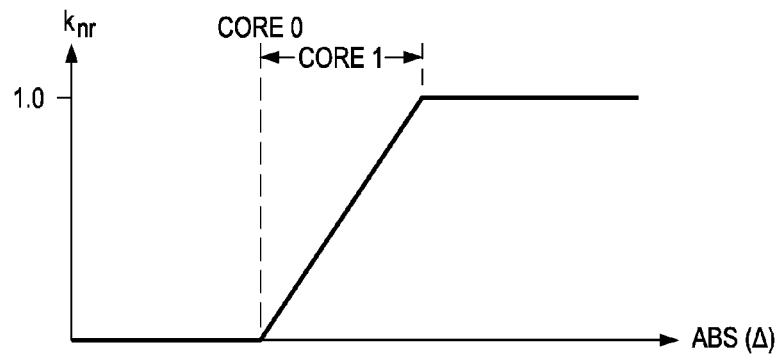
FIG. 6 is a graph depicting the relationship between an adaptive filter parameter and noise parameters that can be implemented by a filter according to an aspect of the present invention.

As mentioned above, the value of the noise factor k that is employed by the multiplier 204 can be computed and selected as a function of a measure of noise. For example, the noise factor k can be selected from a value of $k_{nr}$ and $k_m$, such as shown and described with respect to FIG. 4. Additionally, the value of $k_{nr}$ can be calculated according to Eq. 1. FIG. 6 depicts a graph demonstrating the relationship between $k_{nr}$ and an absolute value of Δ according to the coring thresholds CORE0 and CORE1. Since the coring thresholds CORE0 and CORE1 are adaptively determined, the resulting value for $k_{nr}$ also is adaptive according to the measure of noise. Additionally, the value of $k_{nr}$ for each pixel can further vary as a function of the noise sensitivity factor and coring limits, which may be updated periodically (e.g., once per frame).

Referring between FIGS. 5 and 6, it is shown that if $k=k_{nr}=0$, which can occur if $\Delta<$CORE0, the present output circulates (e.g., $y(n)=y(n-1)$). If $k=k_{nr}=1$, which can occur if $\Delta>$(CORE0+CORE1), the input $x(n)$ is passed through unfiltered (e.g., $y(n)=x(n)$). The value of k that is employed by the multiplier further can be selected (e.g., by the selector of FIG. 4) based on whether low noise is present (e.g., corresponding to the LOW NOISE PRESENT signal generated by a low noise detector of FIG. 3) and based on the noise measurement.

Figure 7:
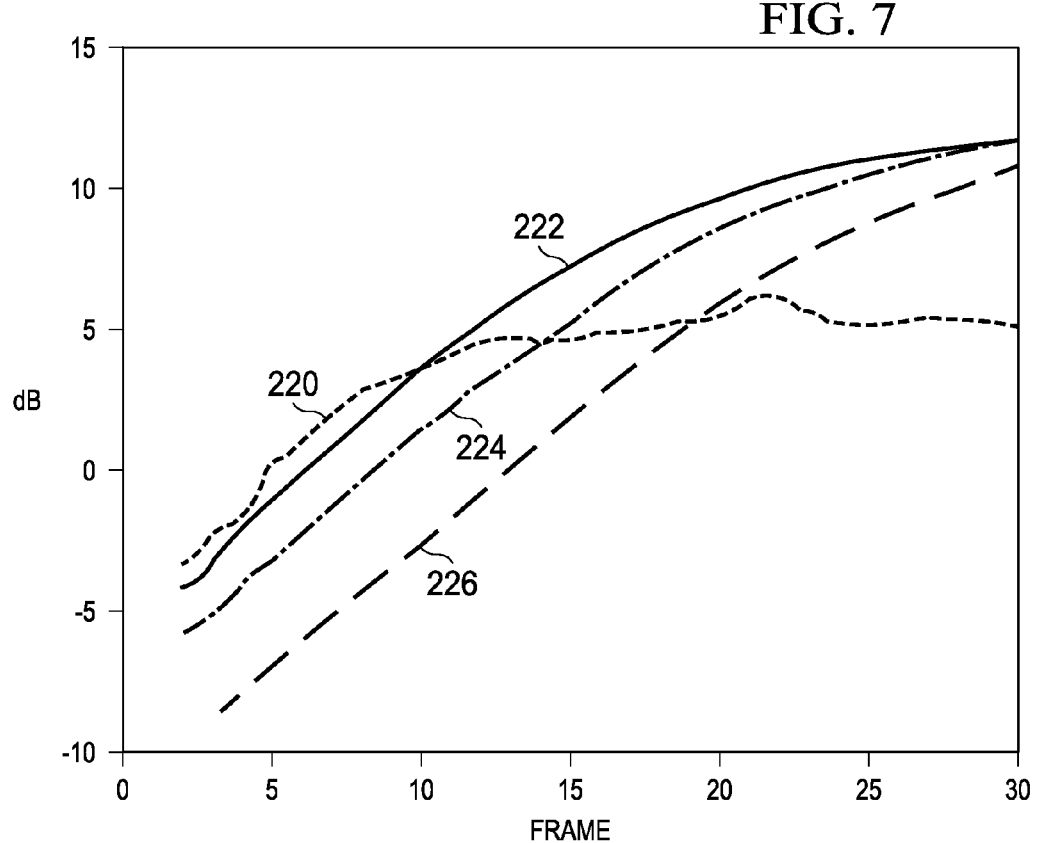
FIG. 7 is graph depicting noise reduction characteristics for a luma video component according to an aspect of the present invention.
Figure 8:
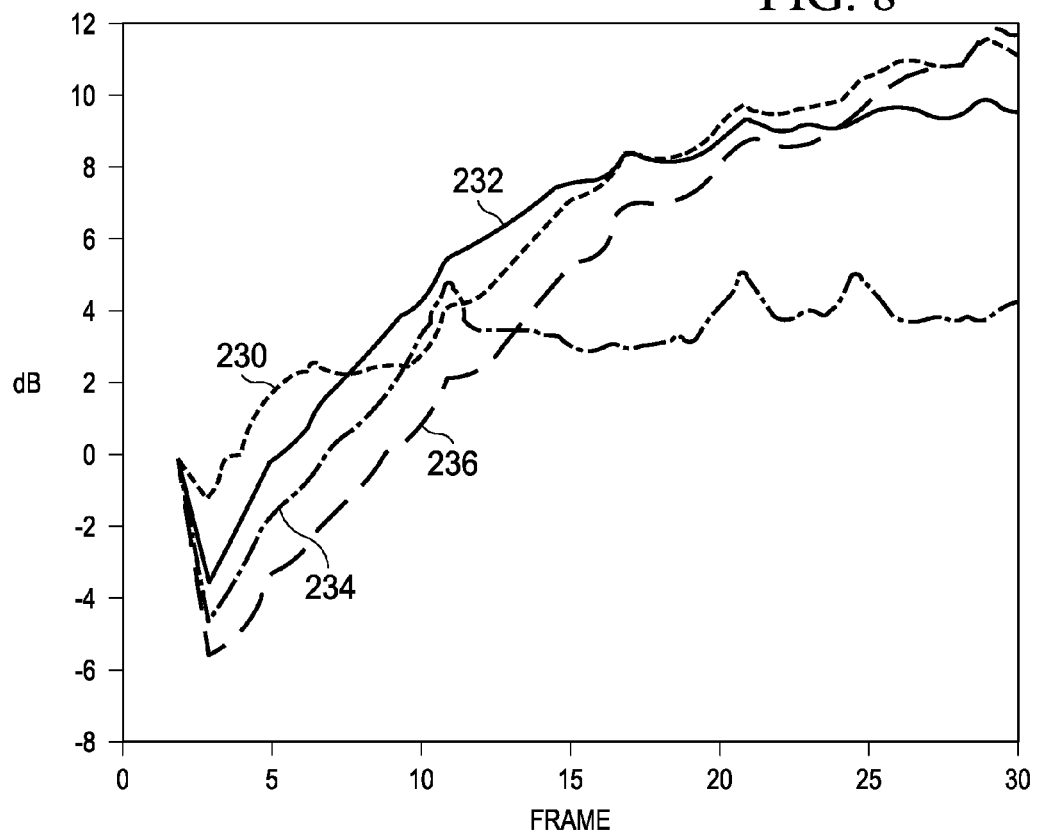
FIG. 8 is graph depicting noise reduction characteristics for a first chroma video component according to an aspect of the present invention.
Figure 9:
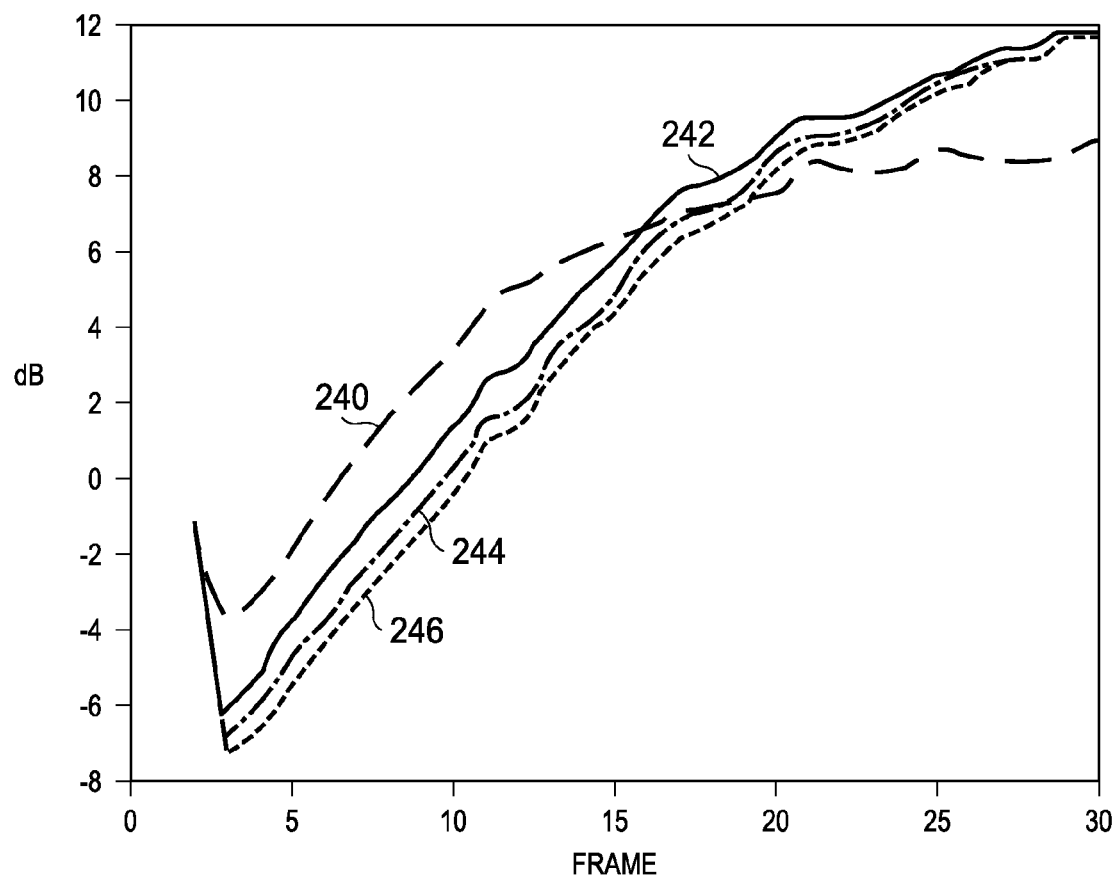
FIG. 9 is graph depicting noise reduction characteristics for a second chroma video component according to an aspect of the present invention.

FIGS. 7, 8 and 9 are graphs depicting noise reduction that can be achieved by noise reduction filters for each of Y, U and V components, respectively, according to an aspect of the present invention. FIG. 7 is a graph depicting noise reduction characteristics for the Y component of a digital video signal over a plurality of video frames for different values of a luma noise sensitivity factor ($\lambda_y$), indicated at 220, 222, 224 and 226. In particular, FIG. 7 illustrates noise reduction characteristics of a filter when a green raster input signal is provided with a random noise of maximum amplitude 28 IRE introduced on to the input signal. The curve 220 corresponds to $\lambda_y=2.0$, curve 222 corresponds to $\lambda_y=3.0$, curve 224 corresponds to $\lambda_y=4.0$, and curve 226 corresponds to $\lambda_y=5.0$. Each of the curves 222, 224 and 226 generally converges to approximately 12 dB noise reduction after about 30 frames, whereas the noise reduction filter programmed with a $\lambda_y=2.0$ converges to approximately 5 dB noise reduction after about 15 frames.

FIG. 8 is a graph depicting noise reduction characteristics for the U-chroma component of a digital video input signal over a plurality of video frames for different values of a chroma noise sensitivity factor ($\lambda_{uv}$), indicated at curves 230, 232, 234 and 236. The curves 230, 232, 234 and 236 represent noise reduction characteristics for a green raster input signal with a random noise of approximately maximum amplitude 28 IRE being introduced. The curve 230 corresponds to $\lambda_{uv}=2.0$, curve 232 corresponds to $\lambda_{uv}=3.0$, curve 234 corresponds to $\lambda_{uv}=4.0$, and curve 236 corresponds to $\lambda_{uv}=5.0$. Each of the curves 232, 234 and 236 begins to converge to approximately 10-12 dB noise reduction after about 25 frames, whereas the noise reduction filter programmed with a $\lambda_y=2.0$ converges to approximately 4 dB noise reduction after about 12 frames. The noise reduction for chroma is less due to the noise reduction characteristics for a corresponding color low pass filter.

FIG. 9 is a graph depicting noise reduction characteristics for the Y-chroma component of a digital video input signal over a plurality of video frames for different values of a chroma noise sensitivity factor ($\lambda_{uv}$), indicated at curves 240, 242, 244 and 246. The curves 240, 242, 244 and 246 represent noise reduction characteristics for a green raster input signal with a random noise of approximately maximum amplitude 28 IRE being introduced. The curve 240 corresponds to $\lambda_{uv}=2.0$, curve 242 corresponds to $\lambda_{uv}=3.0$, curve 244 corresponds to $\lambda_{uv}=4.0$, and curve 246 corresponds to $\lambda_{uv}=5.0$. Each of the curves 242, 244 and 246 begins to converge to approximately 12 dB noise reduction after about 28 frames, whereas the noise reduction filter programmed with a $\lambda_y=2.0$ (curve 240) begins to converge to approximately 9 dB noise reduction after about 20 frames.

A filter system implemented according to an aspect of the present invention can be calibrated to reduce interframe noise. As mentioned above with respect to FIGS. 3 and 4, noise sensitivity factors ($\lambda_y$, $\lambda_{uv}$) and coring limits (Y_CORE0 LIMIT, UV_CORE0 LIMIT) can be programmed to achieve desired filter characteristics. For example, the noise sensitivity factors and coring limits can be programmed by writing to predetermined address locations in an associated register or other memory space. The calibration of the noise reduction filter system may be done separately for each of the luma and chroma signal components.

Figure 10:
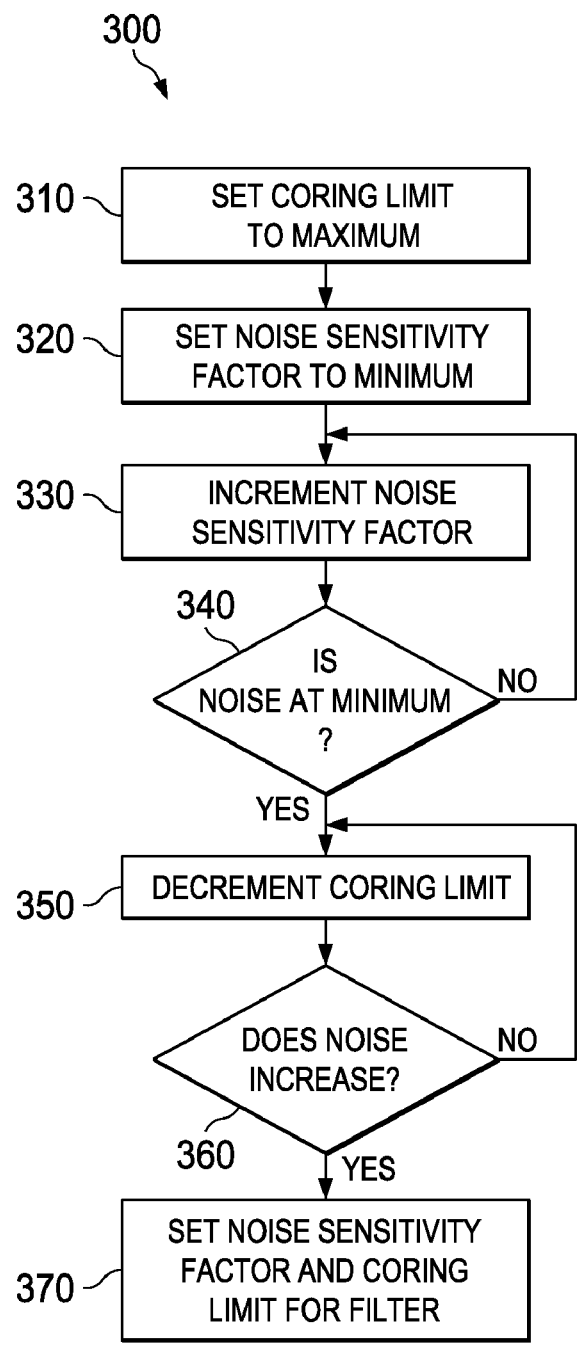
FIG. 10 is a flow diagram depicting a calibration method that can be employed to configure a noise reduction filter according to an aspect of the present invention.

By way of example, FIG. 10 depicts an example of a calibration method 300 that can be employed to configure each component noise reduction filter in a filter system implemented according to an aspect of the present invention. The calibration method 300 can be implemented using a video test pattern that is modulated to RF, attenuated, and then demodulated to baseband. For example, a grey raster pattern can be used for the luma noise reduction filter and a blue raster for the chroma noise reduction filters.

Turning to FIG. 10, the method 300 begins at 310, in which a coring limit is set to a maximum value. At 320, the noise sensitivity factor is set to a minimum. While the video test pattern is being provided and separated into the respective component for which the procedure is being implemented, the noise sensitivity factor is incremented at 330. A measure of noise can be analyzed. At 340, a determination is made as to whether the noise is at a minimum level. If the measure of noise is not at minimum level (NO), the method returns to 330 and the noise sensitivity factor is incremented further. If the noise is determined at 340 to be at a minimum level (YES), the method proceeds to 350. At 350, the coring limit is decremented.

At 360, a determination is made as to whether the measure of noise has increased in response to decreasing the coring limit at 350. If the measure of noise has not increased (NO), the method returns to 350 to decrease the coring limit further. If the measure of noise increases in response to decreasing the coring limit (YES), the method proceeds to 370. At 370, the values of noise sensitivity parameter the coring limit parameters can be stored and used as permanent settings for the noise reduction filter. The calibration procedure 300 can be employed to configure each of the respective filters in a filter system implemented based on the teachings contained herein. It is to be understood and appreciated that the calibration method 300 can be automated, such as implemented by a processor running computer executable instructions, or manually, or it can be implemented a combination thereof.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system to reduce noise comprising:
  a noise measurement device that provides a measure of noise associated with a digital input video signal; and
  a noise reduction filter that provides a noise-reduced digital output video signal corresponding to a component of the digital input video signal, the noise reduction filter having a parameter that varies on a pixel basis for the component of the digital input video signal as a function of the measure of noise, and
  wherein a coring function adaptively determines at least one coring value as a function of the measure of noise and a noise sensitivity parameter, the parameter of the noise reduction filter being determined as a function of the at least one coring value for, and wherein a noise sensitivity factor is increased until noise is at a minimum, and coring limit is decreased until noise increases.

2. The system of claim 1, wherein the noise measurement device measures the noise of the digital input video when there is no active video present.

3. The system of claim 1, wherein the coring function provides first and second coring values, the system further comprising a parameter calculator that computes the parameter of the noise reduction filter as a function of the first and second coring values on a per pixel basis for the component of the digital input video signal.

4. The system of claim 3, wherein parameter calculator computes the parameter (knr) according to following equation:

$$k_{nr} = \begin{cases} 0 & \text{if } \Delta < CORE0 \\ 1 & \text{if } \Delta > (CORE0 + CORE1) \\ \left(\dfrac{\Delta - CORE0}{CORE1}\right) & \text{if } CORE0 \leq \Delta \leq CORE1 \end{cases}$$

where: $\Delta$=a difference between the component of the digital input video signal and a delayed version of the noise-reduced digital output video signal;
CORE0=the first coring value; and
CORE1=the second coring value.

5. The system of claim 4, further comprising a parameter selector that selects one of knr for a given pixel and a motion parameter indicative of motion for the given pixel based on the measure of noise, the noise reduction filter employing the parameter selected by the parameter selector to control noise reduction characteristics of the noise reduction filter for reducing noise associated with the given pixel.

6. The system of claim 3, wherein the parameter of the noise reduction filter that is computed by the parameter calculator is a noise reduction parameter, the system further comprising a parameter selector that selects one of the noise reduction parameter computed for a given pixel and a parameter indicative of motion for the given pixel based on the measure of noise, the noise reduction filter employing the parameter selected by the parameter selector to control noise reduction characteristics of the noise reduction filter for reducing noise associated with the given pixel.

7. The system of claim 6, further comprising a low noise detector that provides a low noise value that indicates whether low noise is present in the digital input video signal based on the measure of noise, if the low noise value indicates that low noise is present, the parameter selector selects a maximum of the noise reduction parameter computed for the given pixel and the parameter indicative of motion for the given pixel, else the parameter selector selects the noise reduction parameter computed for the given pixel.

8. The system of claim 3, wherein the coring function determines the first coring value as a function of the measure of noise, the noise sensitivity factor and a coring limit, the second coring values being determined as a function of the first coring value, at least one of the noise sensitivity factor and the coring limit being programmable.

9. The system of claim 1, further comprising a frame buffer that buffers the noise-reduced output signal and feeds the noise-reduced buffer signal as a corresponding input to the noise reduction filter to enable the filter to recursively reduce noise for the digital input signal over a plurality of frames.

10. The system of claim 1, further comprising:
a separator that separates the digital input video signal into a luma component signal, a first chroma component signal and a second chroma component signal;
wherein the noise reduction filter further comprises:
a luma noise reduction filter that removes noise from the luma component signal to provide a noise-reduced luma component signal according to a luma noise reduction filter parameter that adaptively varies, on a per pixel basis, based on the measure of noise;
a first chroma noise reduction filter that removes noise from the first chroma component signal to provide a noise-reduced first chroma component signal according to a first chroma noise reduction filter parameter that adaptively varies, on a per pixel basis, based on the measure of noise; and
a second chroma noise reduction filter that removes noise from the second chroma component signal to provide a noise-reduced second chroma component signal according to a second chroma noise reduction filter parameter that adaptively varies, on a per pixel basis, based on the measure of noise.

11. The system of claim 10, further comprising:
a luma coring function that adaptively determines a first luma coring value as a function of the measure of noise, a luma noise sensitivity factor and a luma coring limit, a second luma coring value being determined as a function of the first luma coring value, the luma noise reduction filter parameter being determined as a function of the first luma coring value and the second luma coring value; and
a chroma coring function that adaptively determines a first chroma coring value as a function of the measure of noise, a chroma noise sensitivity factor and a chroma coring limit, a second chroma coring value being determined as a function of the first chroma coring value, each of the first and second chroma noise reduction filter parameters being determined as a function of the first chroma coring value and the second chroma coring value.

12. The system of claim 11, further comprising:
a luma parameter calculator that computes the luma noise reduction filter parameter, on a per pixel basis, as a function of the first and second luma coring values and as a function of a difference between the luma component signal and a delayed version of the noise-reduced luma component signal;
a first chroma parameter calculator that computes the first chroma noise reduction filter parameter, on a per pixel basis, as a function of the first and second chroma coring values and as a function of a difference between the first chroma component signal and a delayed version of the noise-reduced first chroma component signal; and
a second chroma parameter calculator that computes the second chroma noise reduction filter parameter, on a per pixel basis, as a function of the first and second chroma coring values and as a function of a difference between the second chroma component signal and a delayed version of the noise-reduced second chroma component signal.

13. The system of claim 12, further comprising:
a luma parameter selector that selects one of the luma noise reduction filter parameter computed for a given pixel and a motion parameter indicative of motion for the given pixel based on the measure of noise, the luma noise reduction filter controlling noise reduction characteristics associated with the given pixel according to the parameter selected by the luma parameter selector;

a first chroma parameter selector that selects one of the first chroma noise reduction filter parameter computed for a given pixel and the motion parameter for the given pixel based on the measure of noise, the first chroma noise reduction filter controlling noise reduction characteristics associated with the given pixel according to the parameter selected by the first chroma parameter selector; and a second chroma parameter selector that selects one of the second chroma noise reduction filter parameter computed for a given pixel and the motion parameter for the given pixel based on the measure of noise, the second chroma noise reduction filter controlling noise reduction characteristics associated with the given pixel according to the parameter selected by the first chroma parameter selector.

14. A video noise reduction system, comprising:

a separator that separates a digital input video signal into a luma component signal, a first chroma component signal and a second chroma component signal;

a noise measurement device that provides a measure of noise associated with the digital input video signal;

a luma noise reduction filter configured to recursively filter the luma component signal and provide a corresponding noise-reduced luma component signal, the luma noise reduction filter having noise reduction characteristics that adaptively vary according to a luma noise reduction filter parameter that is computed based on the measure of noise;

a first chroma noise reduction filter configured to recursively filter the first chroma component signal and provide a corresponding noise-reduced first chroma component signal, the first chroma noise reduction filter having noise reduction characteristics that adaptively vary according to a first chroma noise reduction filter parameter that is computed based on the measure of noise; and a second chroma noise reduction filter configured to recursively filter the second chroma component signal and provide a corresponding noise-reduced second chroma component signal, the second chroma noise reduction filter having noise reduction characteristics that adaptively vary on a pixel basis according to a second chroma noise reduction filter parameter that is computed based on the measure of noise;

a luma coring function that adaptively determines a first luma coring value as a function of the measure of noise, a luma noise sensitivity factor and a luma coring limit, a second luma coring value being determined as a function of the first luma coring value, the luma noise reduction filter parameter being determined, on a per pixel basis, as a function of the first luma coring value and the second luma coring value; and a chroma coring function that adaptively determines a first chroma coring value as a function of the measure of noise, a chroma noise sensitivity factor and a chroma coring limit, a second chroma coring value being determined as a function of the first chroma coring value, each of the first and second chroma noise reduction filter parameters being determined, on a per pixel basis, as a function of the first chroma coring value and the second chroma coring value;

wherein a coring function adaptively determines at least one coring value as a function of the measure of noise and a noise sensitivity parameter, the parameter of the noise reduction filter being determined as a function of the at least one coring value for, and wherein a noise sensitivity factor is increased until noise is at a minimum, and coring limit is decreased until noise increases.

15. The system of claim 14, further comprising:

a luma parameter selector that selects one of the luma noise reduction filter parameter computed for a given pixel and a motion parameter indicative of motion for the given pixel based on the measure of noise, the luma noise reduction filter employing the parameter selected by the luma parameter selector to implement noise reduction characteristics for the given pixel;

a first chroma parameter selector that selects one of the first chroma noise reduction filter parameter computed for a given pixel and the motion parameter for the given pixel based on the measure of noise, the first chroma noise reduction filter employing the parameter selected by the first chroma parameter selector to implement noise reduction characteristics for the given pixel; and a second chroma parameter selector that selects one of the second chroma noise reduction filter parameter computed for a given pixel and the motion parameter for the given pixel based on the measure of noise, the second chroma noise reduction filter employing the parameter selected by the second chroma parameter selector to implement noise reduction characteristics for the given pixel.

16. The system of claim 15, further comprising a luma parameter calculator that computes the luma noise reduction filter parameter, on a per pixel basis, as a function of the first and second luma coring values and as a function of a difference between the luma component signal and a delayed version of the noise-reduced luma component signal;

a first chroma parameter calculator that computes the first chroma noise reduction filter parameter, on a per pixel basis, as a function of the first and second chroma coring values and as a function of a difference between the first chroma component signal and a delayed version of the noise-reduced first chroma component signal; and a second chroma parameter calculator that computes the second chroma noise reduction filter parameter, on a per pixel basis, as a function of the first and second chroma coring values and as a function of a difference between the second chroma component signal and a delayed version of the noise-reduced second chroma component signal.

17. The system of claim 14, further comprising:

a first frame buffer that buffers the noise-reduced luma component signal to provide the delayed version of the noise-reduced luma component signal;

a second frame buffer that buffers the noise-reduced first chroma component signal to provide the delayed version of the noise-reduced first chroma component signal; and a third frame buffer that buffers the noise-reduced second chroma component signal to provide the delayed version of the noise-reduced second chroma component signal.

18. A system to reduce noise in a digital input video signal, comprising:

means for setting a noise sensitivity factor to minimum;

means for incrementing the noise sensitivity factor until noise is at a minimum;

means for decrementing coring limit until noise increases; and means for setting the noise sensitivity factor and coring limit for the noise filter.

19. The system of claim 18, wherein at least one of the means for decrementing the coring limit or the means for setting the noise sensitivity factor and coring limit comprising:

means for determining a first coring value as a function of the measure of noise, a noise sensitivity factor and a coring limit, at least one of the noise sensitivity factor and the coring limit being programmable;

means for determining a second coring value as a function of the first coring value, means for calculating the noise reduction filter parameter as a function of the first and second coring values, the noise reduction filter parameter being determined on a per pixel basis for the digital input video signal component; and means for selecting the filter parameter for a given pixel as one of the calculated noise reduction filter parameter and a motion parameter indicative of motion for the given pixel based on the measure of noise, the means for recursively filtering implementing noise reduction characteristics to reduce noise associated with the given pixel according to the filter parameter that is selected by the means for selecting.

20. A noise reduction method for a noise filter, comprising:

setting a coring limit to maximum;

setting a noise sensitivity factor to minimum;

incrementing the noise sensitivity factor until noise is at a minimum;

decrementing coring limit until noise increases; and setting the noise sensitivity factor and coring limit for the noise filter.

* * * * *